(12) United States Patent
McClennon et al.

(10) Patent No.: US 7,843,858 B2
(45) Date of Patent: Nov. 30, 2010

(54) CROSSTALK MASKING FOR DIGITAL SUBSCRIBER LOOPS

(75) Inventors: Scott McClennon, Ottawa (CA); Andre Paquette, Kanata (CA)

(73) Assignee: Ciena Corporation, Linthicum, MD (US)

( * ) Notice: Subject to any disclaimer, the term of this patent is extended or adjusted under 35 U.S.C. 154(b) by 2206 days.

(21) Appl. No.: 10/406,820

(22) Filed: Apr. 4, 2003

(65) Prior Publication Data

US 2003/0231603 A1 Dec. 18, 2003

(30) Foreign Application Priority Data

Apr. 4, 2002 (CA) .................................. 2380246

(51) Int. Cl.
*H04B 3/20* (2006.01)
*H04B 1/10* (2006.01)
*H04J 3/16* (2006.01)
*H04M 7/00* (2006.01)

(52) U.S. Cl. .................. 370/286; 370/465; 375/350; 379/416

(58) Field of Classification Search .................. 370/286, 370/346, 465; 379/399.01, 416; 375/350, 375/346
See application file for complete search history.

(56) References Cited

U.S. PATENT DOCUMENTS

| | | | | |
|---|---|---|---|---|
| 4,441,090 A * | 4/1984 | Warren | .......................... | 333/165 |
| 4,450,555 A * | 5/1984 | Pays | ............................ | 370/201 |
| 4,688,245 A * | 8/1987 | Schenk | ................... | 379/406.08 |
| 5,982,741 A * | 11/1999 | Ethier | .......................... | 370/201 |
| 5,991,311 A * | 11/1999 | Long et al. | ................... | 370/524 |
| 6,160,790 A | 12/2000 | Bremer | | |
| 6,317,495 B1 | 11/2001 | Gaikwad et al. | | |
| 6,714,520 B1 * | 3/2004 | Okamura | ..................... | 370/286 |
| 6,775,355 B1 * | 8/2004 | Bingel et al. | .................... | 379/7 |
| 6,834,109 B1 * | 12/2004 | Pare et al. | ..................... | 379/416 |
| 6,885,746 B2 * | 4/2005 | Hausman et al. | ............ | 379/417 |
| 6,965,657 B1 * | 11/2005 | Rezvani et al. | .............. | 375/346 |
| 6,990,196 B2 * | 1/2006 | Zeng et al. | ................... | 379/417 |
| 6,999,583 B2 * | 2/2006 | Valenti et al. | ................ | 379/417 |
| 7,142,501 B1 * | 11/2006 | Barrass et al. | ................ | 370/201 |
| 7,164,764 B2 * | 1/2007 | Zimmerman et al. | ......... | 379/417 |
| 7,570,685 B2 * | 8/2009 | Takatori et al. | .............. | 375/219 |
| 7,613,234 B2 * | 11/2009 | Raghavan et al. | ........... | 375/219 |
| 2001/0012321 A1 * | 8/2001 | Terry | .......................... | 375/227 |
| 2002/0041643 A1 * | 4/2002 | Tzannes et al. | ............. | 375/346 |
| 2002/0101981 A1 * | 8/2002 | Sugiyama | .............. | 379/406.01 |
| 2002/0118733 A1 * | 8/2002 | Frenkel | ....................... | 375/219 |
| 2002/0150059 A1 * | 10/2002 | Blake | .......................... | 370/286 |
| 2002/0191552 A1 * | 12/2002 | Watkinson | .................... | 370/286 |
| 2003/0072380 A1 * | 4/2003 | Huang | .......................... | 375/261 |
| 2003/0086514 A1 * | 5/2003 | Ginis et al. | .................. | 375/346 |
| 2003/0112967 A1 * | 6/2003 | Hausman et al. | ............ | 379/417 |
| 2005/0180519 A1 * | 8/2005 | Betts | .......................... | 375/260 |
| 2005/0186933 A1 * | 8/2005 | Trans | .......................... | 455/296 |
| 2008/0117805 A1 * | 5/2008 | Azadet | ....................... | 370/201 |

* cited by examiner

*Primary Examiner*—Warner Wong
(74) *Attorney, Agent, or Firm*—Clements Bernard PLLC; Christopher L. Bernard; Lawrence A. Baratta, Jr.

(57) ABSTRACT

A method is provided for reducing crosstalk problems in digital subscriber loop systems. The problems are associated with a second receiver on a second loop responding to a signal from a first transmitter on a first loop. The signal is actually destined for a first receiver and is coupled between the first transmitter and the second receiver as a crosstalk signal. The method includes the step of transmitting a masking signal from a second transmitter to the second receiver for masking said crosstalk signal.

19 Claims, 3 Drawing Sheets

CROSSTALK MASKING FOR DIGITAL SUBSCRIBER LOOPS

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention relates generally to Digital Subscriber Loop (DSL) technology and specifically to a method for masking crosstalk from adjacent loops.

Remote access and retrieval of data is becoming increasingly popular in data communication. The proliferation of the Internet has provided a vast network of information that is available to the general public. As the Internet grows and technology advances, this information is becoming increasingly voluminous and the details are become increasingly intricate. What used to comprise mainly of text information has grown to include still and moving images as well as sound. The increase in volume of information to be transferred has presented a need for a high-speed Internet connection, since traditional telephone modems communicate at speeds too slow for efficient communication.

One proposal for high-speed communication is the introduction of Digital Subscriber Line (DSL) technology. Currently, there many different DSL standards, including Asymmetric DSL (ADSL), High-speed DSL (HDSL), Very High Speed DSL (VDSL), Single-line DSL (SDSL), Single-line, High-speed DSL (SHDSL) and Integrated Services Digital Network (ISDN) DSL systems. Generically, the term xDSL is used to represent these, and other, standards. One of the most attractive features of xDSL is that it is implemented using an infrastructure that already exists. xDSL shares copper twisted pair lines typically used for telephone communication.

Some DSL technologies, including SDSL, ISDN DSL, SHDDL, and HDSL are baseband schemes that cover a band (0 to 4 kHz) dedicated to Plain Old Telephone Service (POTS). Thus, these schemes cannot co-exist with POTS. However, other DSL technologies, including ADSL and VDSL, share the twisted pair with POTS. However, only a small portion of the available bandwidth of the twisted pair line is used for POTS. These schemes takes advantage of the remaining available frequency spectrum for transmitting data and, therefore, can co-exist with POTS.

An xDSL modem is a device that modulates and demodulates signals across an xDSL physical interface. A transceiver unit at a remote location (xTU-R) refers to a modem located at a customer's site, and a transceiver unit at a central location (xTU-C) refers to modem located in a central office (CO) or remote terminal (RT) of a loop provider. Each transceiver typically includes a transmitter and a receiver. Again, the "x" refers generically to transceivers designed for different standards. For example, for ADSL the transceivers are referred to as an ATU-R and an ATU-C.

In the many standards of digital subscriber loops, various protocols including activation, initiation, training, and showtime have been designed for initializing communication with between the xTU-C and xTU-R. Activation, for example, is the process of discovery of the xTU-C by the xTU-R, or vice versa, through the use of protocol specific signals. For systems designed to operate with significant loop losses, crosstalk from xDSL systems on adjacent lines can cause significant problems, especially for activation signals. Crosstalk is a disturbance caused by an electric or magnetic fields of one telecommunication signal affecting a signal in an adjacent circuit.

Referring to FIG. 1, a block diagram illustrating a system affected by crosstalk is shown generally by numeral 100. The present example refers specifically to a non-overlapped ADSL system. That is, upstream and downstream transmit signals reside in separate, non-overlapped frequency bands. A first ADSL loop 102 connects a first ATU-C 106a with a first ATU-R 106b. A second ADSL loop 104 connects a second ATU-C 108a with a second ATU-R 108b. Typically, both the first and second ATU-Rs 106b and 108b are designed to be capable of responding to signals that may have experienced significant loop loss. This is true because they are designed to be able to operate on various loop lengths.

In the present example, the first loop 102 is longer than the second loop 104. The first loop 102 is relatively long, thus the two transmitters on that loop, the ATU-C 106a downstream transmitter as well as the ATU-R 106b upstream transmitter, transmit at full power so as to overcome those loop losses. The second loop 104 is relatively short (for example, having loop losses on the order of 10 dB or less). However, due to the proximity of the loops 102 and 104, as well as the proximity of the first ATU-C 106a and the second ATU-R 108b, there is significant crosstalk 110 coupling from the transmitter of the first ATU-C 106a to the receiver of the second ATU-R 108b. This crosstalk signal is referred to as Far End Crosstalk (FEXT), since the victim receiver (in the ATU-R 108b) is on the far end of the loop from the offending transmitter (in the ATU-C 106a). Generally, FEXT reduces as the distance increases between the victim and the offender. The crosstalk coupling loss can be on the order of 70 dB in the ADSL frequency band of interest, which is similar to the loop loss for a long loop. Therefore, the second ATU-R 108b may perceive the crosstalk signal from the transmitter of the first ATU-C 106a as a signal received from a distant ATU-C at the other end of its own loop, since the ATU-R 108b may not have a priori knowledge of the length of its own loop.

If the transmitted signal is an activation signal, the crosstalk can be falsely detected as a valid activation signal, especially where the crosstalk comes from an xDSL system of the same class. When activation signals are falsely detected, proper initialization of the transceiver falsely detecting the signal can be delayed, sometimes indefinitely.

Referring to FIG. 2, a graph illustrating a snapshot of the frequency spectrum in a non-overlapped spectra ADSL case is shown generally by numeral 200. The ATU-R 108b sends activation tones 202 in the upstream band, but the ATU-C 108a is not sending any tones in the downstream band. In this figure, the crosstalk signals 204 shown in the downstream band may cause the ATU-R 108b transceiver to become confused and attempt to activate the line.

Therefore, there is a need for a method of inhibiting a transceiver from responding to a crosstalk activation signal. It is an object of the present invention to obviate or mitigate at least some of the above-mentioned disadvantages.

BRIEF SUMMARY OF THE INVENTION

In accordance with an aspect of the present invention, there is provided a method for reducing crosstalk problems in digital subscriber loop systems associated with a second receiver on a second loop responding to a signal from a first transmitter on a first loop, wherein the signal is destined for a first receiver and is coupled between the first transmitter and the second receiver as a crosstalk signal. The method includes the step of transmitting a masking signal from a second transmitter to the second receiver for masking the crosstalk signal. The method may also be implemented in hardware or via a computer program.

BRIEF DESCRIPTION OF THE DRAWINGS

An embodiment of the present invention will now be described by way of example only with reference to the following drawings in which.

DETAILED DESCRIPTION OF THE INVENTION

Figure 1:
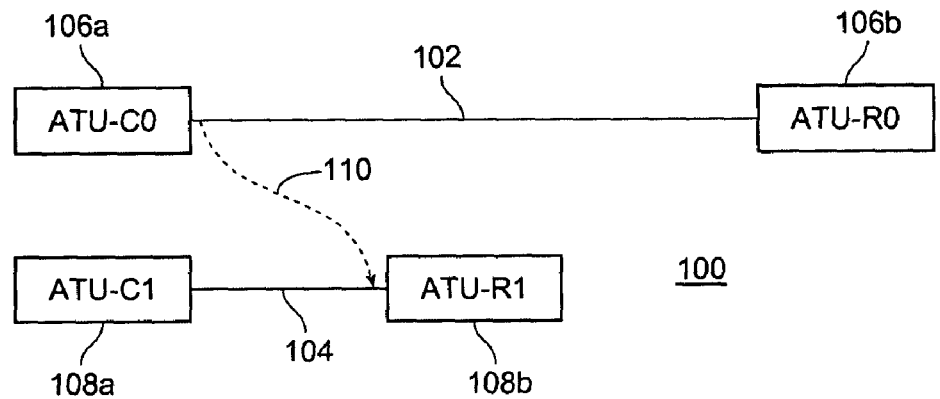
FIG. 1 is a block diagram of two ADSL loops where FEXT is a problem (prior art)

For convenience, like numerals in the description refer to like structures in the drawings. A signal is provided for masking a crosstalk signal so that only intended activation signals are detected by a transceiver and initiation can proceed normally. Referring once again to FIGS. 1 and 2, the crosstalk can be masked by sending an appropriate broadband random signal, referred to as a masking signal. The masking signal is transmitted across the frequency range of the ATU-R receiver 108b likely to be affected. The masking signal is preferably uncorrelated with standard ADSL activation, initialization, and showtime signals, and is transmitted at a level high enough to mask the crosstalk signals. For the ADSL system illustrated in FIG. 1, it is convenient to employ a MEDLEY signal as the crosstalk masking signal. MEDLEY is an aperiodic sequence that is also employed during normal ADSL link initialization. When used without a pilot tone or cyclic prefix, the MEDLEY signal is a good approximation of a broadband random signal.

Continuing the example described with reference to FIG. 1, the first ATU-C 106a transmits a valid ADSL downstream signal, potentially including pilot tone, at a nominal power level of −40 dBm/Hz. As previously described, the second ATU-R 108b, detects the downstream signal from the first ATU-C 106a, in the form of crosstalk 110. The coupling loss associated with the crosstalk 110 is 70 dB. Thus, the second ATU-R 108b receives the downstream signal from the first ATU-C 106a at a power level of approximately −110 dBm/Hz, which is similar to the level that it would expect from a valid ATU-C on a long loop.

However, in accordance with the present embodiment, a masking signal is transmitted from the second ATU-C 108a to the second ATU-R 108b. Assuming worst case crosstalk levels of 60-70 dB below nominal transmitter levels, the masking signal is sent at transmit power spectral density (PSD) levels 30-40 dB below nominal transmit levels. Typically, transmitting the mask at such a power level is sufficient to mask the crosstalk signals 110 at the second ATU-R 108b and thus inhibit false activation. This is true provided the loop loss on the second loop 104 is modest. Barring poor loop quality, the loop loss will be modest because the loop is typically short. Otherwise, the effect of the FEXT would be less significant.

Figure 3:
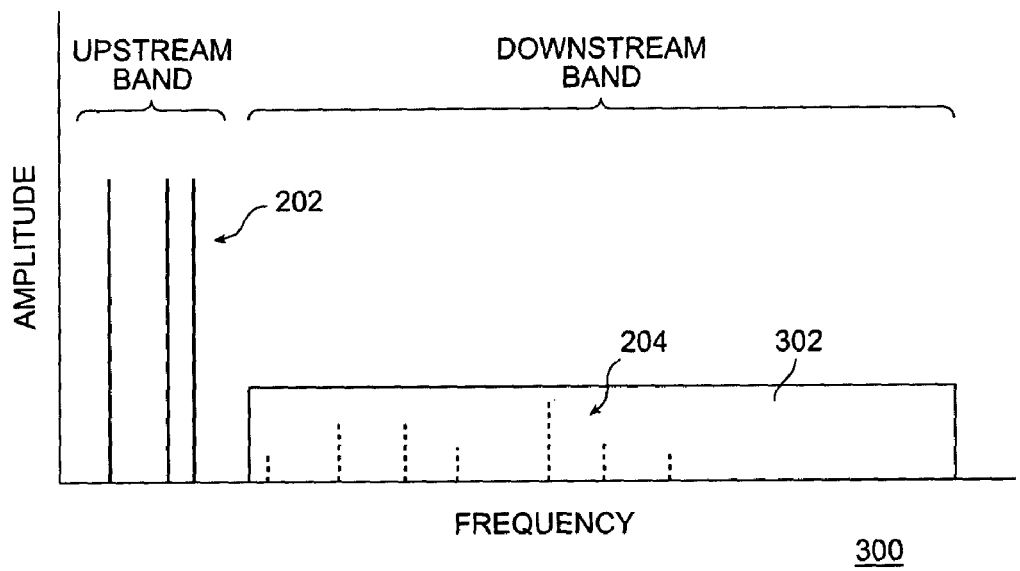
FIG. 3 is a graph illustrating a frequency spectrum snapshot for a non-overlapped ADSL system in accordance with an embodiment of the present invention.

Referring to FIG. 3, a graph illustrating a snapshot of the frequency spectrum in a non-overlapped spectra ADSL including a masking signal is illustrated generally by numeral 300. Assuming that the masking signal is transmitted at a power level of −70 dBm/Hz and that the second loop 104 has a loop loss of 10 dB, the received power level of the masking signal is −80 dBm/Hz. In contrast, the crosstalk 204 is received by the second ATU-R 108b at a level of −110 dBm/Hz. Thus, the second ATU-R 108b perceives only an elevated, artificial receive noise floor 302, with no signals correlated to a possible activation signal. The second ATU-R 108b is not affected by the correlated crosstalk signal, since it is effectively hidden by the masking signal.

When the second ATU-C 108a does transmit a standard activation signal, it will transmit at its nominal level of about 30-40 dB above the artificial noise floor. Since the loop loss is only 10 dB, the ATU-R 108b will have little problem detecting the activation signal and permitting proper activation and initialization.

In order to reduce unnecessary power consumption, as well as for other reasons, it is preferable that the ATU-C 108a transmits the masking signal only when it is suspects that the ATU-R 108b is responding to a crosstalk activation signal. How this is determined is dependent on the xDSL protocol used. For the example illustrated in FIG. 1 of an ADSL ATU-R 108b responding to downstream far-end crosstalk, the ATU-C 108a on the victim system, or second loop 104, determines from an upstream receive signal sequence that the victim ATU-R 108b has advanced in the activation sequence in the absence of its own required corresponding signal. The ATU-C 108a infers that this has occurred because the ATU-R 108b has misinterpreted crosstalk as a valid activation signal or response. As a result, the ATU-C 108a transmits the masking signal to the ATU-R 108b.

Unable to achieve a valid activation response, the ATU-R 108b returns to the start of activation, but is now no longer able to detect the crosstalk signal which is now masked by the masking signal generated by the victim system ATU-C 108a. As a result, the ATU-R 108b continues to search for a valid activation signal/response that may be detected above the masking signal.

Although the above description refers specifically to ADSL technology, it will be apparent to a person skilled in the art that utilization of a crosstalk masking signal may be used in other xDSL systems.

Yet further, although the above description refers specifically to the use of the MEDLEY signal, at a reduced transmit PSD level, as the masking signal, other signals are also applicable. Any broadband signal, bandlimited to the ADSL downstream band for spectral compatibility, that is uncorrelated to the expected activation signals may be adequate to serve as the crosstalk masking signal. MEDLEY is one such a signal and also happens to be easily generated by any ATU-C transmitter.

Figure 2:
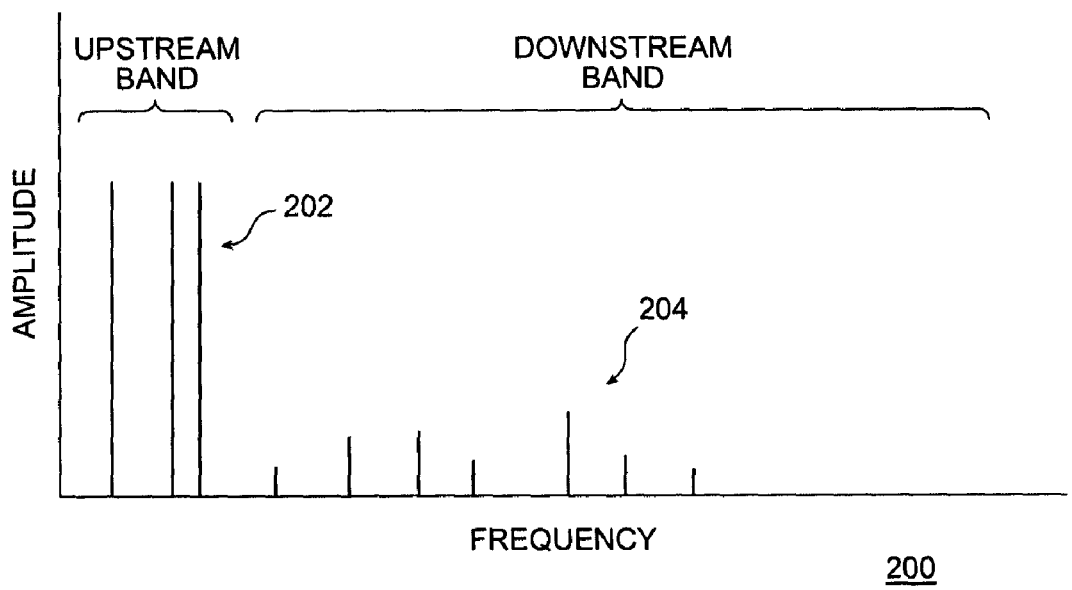
FIG. 2 is a graph illustrating a frequency spectrum snapshot for a non-overlapped ADSL system (prior art)
Figure 4:
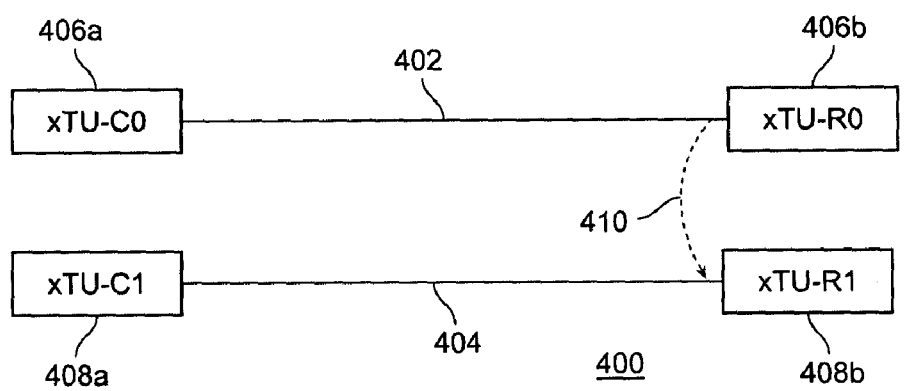
FIG. 4 is a block diagram of two ADSL loops where NEXT is a problem (prior art)

In the non-overlapped ADSL case illustrated in FIG. 1, false activations are due to far-end crosstalk into ATU-R receivers on short loops only. Referring to FIG. 4, a block diagram of an xDSL system 400 having overlapped spectra is illustrated generally. The systems includes a loop 402 coupling an xTU-C 406a and an xTU-R 406b, and a loop 404 coupling an xTU-C 408a and an xTU-R 408b. For such a case, the crosstalk encountered is near-end crosstalk (NEXT) 410, which can occur at significant levels even where the victim loops are long. In such systems, the effectiveness of crosstalk-masking is limited to victim systems on short to medium length loops where the loop losses on the crosstalk masker do not prevent it from being able to mask the crosstalk at the victim receiver.

Figure 5:
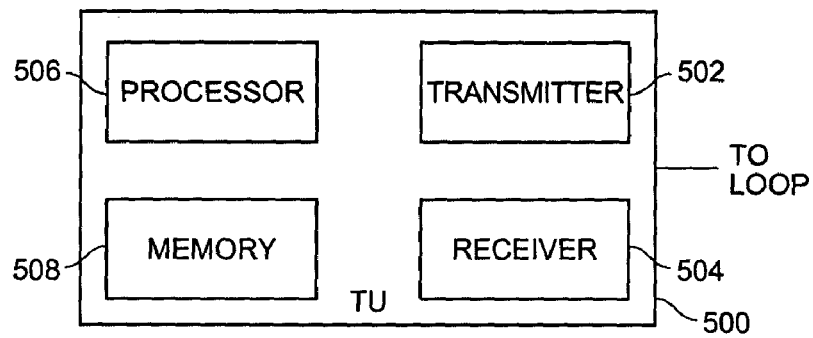
FIG. 5 is a block diagram of a termination unit that includes an embodiment of the present invention.

FIG. 5 is a block diagram of an improved transceiver unit (TU) 500 according to an embodiment of the present invention. The TU 500 sends and receives information on the loop. The TU 500 includes a transmitter 502, a receiver 504, a processor 506, and a memory 508. The transmitter 502 and receiver 504 transmit and receive the xDSL signals on the loop. The processor 506 controls the TU 500, processing information and generating the various control signals. The memory 508 stores data used by the TU 500 and the processor 506, and can also store programs executed by the processor 506. Further functions and features of the TU 500 are as described above in more detail.

Figure 6:
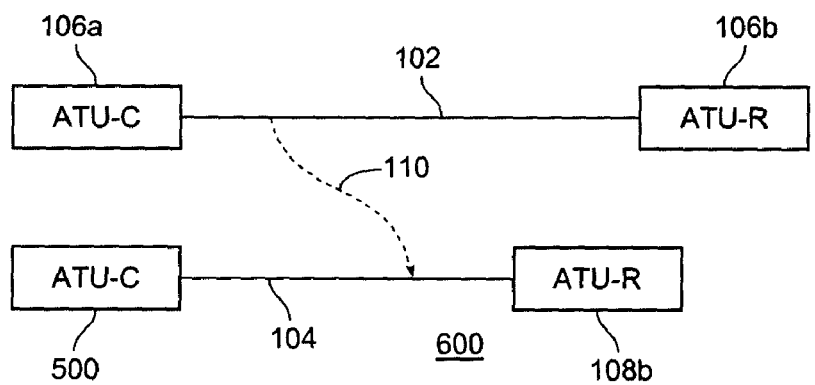
FIG. 6 is a block diagram of two ADSL loops including the termination unit of FIG. 5.

FIG. 6 is a block diagram of an improved system 600 according to an embodiment of the present invention. FIG. 6 is similar to FIG. 1 with the addition of the TU 500 from FIG. 5. Operation of the system 600 is discussed below regarding FIG. 7.

Figure 7:
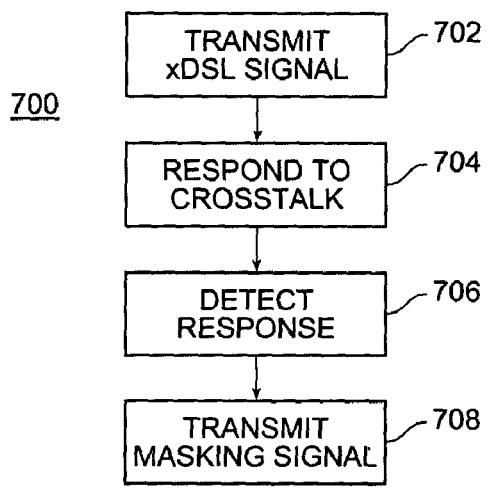
FIG. 7 is a flowchart of a method according to an embodiment of the present invention.

FIG. 7 is a flowchart of a method 700 according to an embodiment of the present invention. The steps of the method 700 are described below with reference to FIG. 6. In step 702, a DSL signal is transmitted on the loop 102 from the ATU-C 106a to the ATU-R 106b. In step 704, the DSL signal is perceived as crosstalk 110 on the loop 104 by the ATU-R 108b. The ATU-R 108b then responds to the crosstalk 110. In step 706, the ATU-C 500 detects the response by the ATU-R 108b. In step 708, the ATU-C 500 transmits the masking signal on the loop 104. The ATU-R 108b then no longer responds to the crosstalk because the crosstalk is masked. More details regarding these steps have already been provided above and are not repeated.

The method 700 may be implemented by the TU 500 of FIG. 5. In such a case, a computer program implementing the method may be stored in the memory 508 and executed by the processor 506. The memory 508 may be a random access memory or any other type of storage (including magnetic memory, floppy disk, optical disk, flash memory, read-only memory, etc.) according to design factors. The processor 506 may be a general-purpose processor or may be a specialized processor for DSL applications. The computer program may be stored on other types of computer-readable media (including magnetic memory, floppy disk, optical disk, flash memory, read-only memory, etc.) prior to being loaded onto the TU 500.

Although the invention has been described with reference to certain specific embodiments, various modifications thereof will be apparent to those skilled in the art without departing from the spirit and scope of the invention as outlined in the claims appended hereto.

What is claimed is:

1. A method of reducing crosstalk problems in a digital subscriber loop (xDSL) system, said xDSL system including a first xDSL transceiver unit (xTU), a second xTU, a first loop coupling said first xTU and said second xTU; a third xTU, a fourth xTU, and a second loop coupling said third xTU and said fourth xTU, wherein a crosstalk signal results from crosstalk between said first loop and said second loop, said method comprising the steps of:
   transmitting an xDSL signal on said first loop from said first xTU to said second xTU, wherein said xDSL signal results in said crosstalk signal on said second loop; and
   transmitting a masking signal on said second loop from said third xTU to said fourth xTU, wherein said masking signal masks said crosstalk.

2. A method as defined in claim 1, wherein said masking signal raises a noise floor at said fourth xTU to a level greater than said crosstalk signal, thereby masking said crosstalk signal.

3. A method as defined in claim 1, wherein said third xTU transmits said masking signal only when said third xTU determines said fourth xTU is responding to said crosstalk from said first loop.

4. A method as defined in claim 3, wherein said third xTU determines that said fourth xTU is responding to said crosstalk signal if said fourth xTU has
   advanced in an information exchange protocol without receiving required signals from said third xTU.

5. A method as defined in claim 4, wherein said information exchange protocol is an activation protocol.

6. A method as defined in claim 1, wherein said xDSL system is a non-overlapped asymmetric DSL system.

7. A method as defined in claim 1, wherein said first xTU and said third xTU are located at a central office.

8. A method as defined in claim 1, wherein said second xTU and said fourth xTU are located at one or more customer sites.

9. A method of masking crosstalk in a digital subscriber loop (xDSL) system, said xDSL system including a first xDSL transceiver unit (xTU), a second xTU, a first loop coupling said first xTU and said second xTU; and further having a third xTU, a fourth xTU, and a second loop coupling said third xTU and said fourth xTU; wherein a crosstalk signal results from crosstalk from said first loop to said second loop, said method comprising:
   transmitting an xDSL signal on said first loop from said first xTU to said second xTU, wherein said xDSL signal results in said crosstalk signal on said second loop;
   calculating a masking signal transmission level high enough on said second loop to mask a crosstalk signal from said first loop;
   transmitting the masking signal at the calculated transmission level on said second loop from said third xTU to said fourth xTU, wherein said masking signal masks said crosstalk signal from said first loop.

10. A method as defined in claim 9, wherein said masking signal raises a noise floor at said fourth xTU to a level greater than said crosstalk signal, thereby masking said crosstalk signal.

11. A method as defined in claim 9, wherein said third xTU transmits said masking signal only when said third xTU determines said fourth xTU is responding to said crosstalk signal from said first loop.

12. A method as defined in claim 11, wherein said third xTU determines that said fourth xTU is responding to said crosstalk signal if said fourth xTU has advanced in an information exchange protocol without receiving required signals from said third xTU.

13. A method as defined in claim 12, wherein said information exchange protocol is an activation protocol.

14. A method as defined in claim 9, wherein said xDSL system is a non-overlapped asymmetric DSL system.

15. A method as defined in claim 9, wherein said first xTU and said third xTU are located at a central office.

16. A method as defined in claim 9, wherein said second xTU and said fourth xTU are located at one or more customer sites.

17. A method as defined in claim 1, wherein said masking signal is a MEDLEY signal that raises a noise floor at said fourth xTU to a level greater than said crosstalk signal, thereby masking said crosstalk signal.

18. A method as defined in claim 1, wherein said masking signal is an aperiodic sequence that raises a noise floor at said fourth xTU to a level greater than said crosstalk signal, thereby masking said crosstalk signal.

19. A method as defined in claim 2, wherein said masking signal is uncorrelated to the information contained in said xDSL signal and uncorrelated to the information contained in said cross talk signal.

* * * * *